(12) United States Patent
Yoneyama et al.

(10) Patent No.: US 6,969,827 B2
(45) Date of Patent: Nov. 29, 2005

(54) HEATED SEAT ASSEMBLY AND METHOD OF MANUFACTURING THE SAME

(75) Inventors: Mitsuru Yoneyama, Nara (JP); Naohito Asami, Nara (JP); Akira Shiratake, Nara (JP); Norio Abe, Kanagawa (JP); Kazumi Nagayama, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 67 days.

(21) Appl. No.: 10/627,692

(22) Filed: Jul. 28, 2003

(65) Prior Publication Data

US 2004/0069762 A1 Apr. 15, 2004

(30) Foreign Application Priority Data

Sep. 4, 2002 (JP) .................................. 2002-258530
Sep. 27, 2002 (JP) .................................. 2002-283186
Sep. 27, 2002 (JP) .................................. 2002-283187

(51) Int. Cl.$^7$ ................................................ H05B 3/34
(52) U.S. Cl. ...................... 219/217; 219/549; 219/202; 29/611
(58) Field of Search ................................ 219/217, 202, 219/528, 529, 548, 549, 545, 211, 212; 338/208; 29/611

(56) References Cited

U.S. PATENT DOCUMENTS

| | | | | |
|---|---|---|---|---|
| 774,623 A | * | 11/1904 | Wales | 219/212 |
| 2,732,479 A | * | 1/1956 | Rowland | 219/529 |
| 3,153,140 A | * | 10/1964 | Theodore et al. | 219/549 |
| 3,859,506 A | * | 1/1975 | Weckstein | 219/529 |
| 4,044,221 A | * | 8/1977 | Kuhn | 219/217 |
| 4,063,069 A | * | 12/1977 | Peeri | 219/545 |
| 5,883,363 A | * | 3/1999 | Motoyoshi et al. | 219/529 |
| 5,915,783 A | | 6/1999 | McDowell et al. | |
| 6,289,832 B1 | * | 9/2001 | Kitamura | 112/470.01 |
| 6,311,637 B1 | * | 11/2001 | Moss | 116/200 |
| 2004/0069762 A1 | * | 4/2004 | Yoneyama et al. | 219/217 |
| 2004/0074589 A1 | * | 4/2004 | Gessler et al. | 156/155 |

FOREIGN PATENT DOCUMENTS

| | | | |
|---|---|---|---|
| JP | 2-129886 | * | 5/1990 |
| JP | 2-227983 | * | 9/1990 |
| JP | 3-145089 | * | 6/1991 |
| JP | 7-87806 | | 9/1995 |
| JP | 8-507404 | | 8/1996 |
| JP | 2621437 | | 4/1997 |
| JP | 2001-87080 | | 4/2001 |
| WO | 94/09684 | | 5/1994 |

OTHER PUBLICATIONS

Japan Patent Abstract 03–015412, published Jan. 23, 1991.

* cited by examiner

Primary Examiner—Teresa J. Walberg
(74) Attorney, Agent, or Firm—Wenderoth, Lind & Ponack, L.L.P.

(57) ABSTRACT

A heating element used for a heated seat assembly of the present invention comprises a base material made of hotmelt material, and a linear heater disposed at a predetermined pattern on the base material. The linear heater is fixed by adhesion or sewing onto the base material. In one example of the present invention, the linear heater is characterized in that a plurality of conductors and threads are braided into the linear heater. In another example, a number of threads comprising the linear heater is at least the same with a number of conductors. According to the heating element of the present invention and the method of manufacturing the heated seat assembly according to the present invention, a heated seat assembly with excellent seating comfort and even seat temperature can be obtained, and the heating element is durable.

20 Claims, 10 Drawing Sheets

US 6,969,827 B2

HEATED SEAT ASSEMBLY AND METHOD OF MANUFACTURING THE SAME

FIELD OF THE INVENTION

The present invention relates to a heated seat assembly used in various transporting means such as aircraft, automobiles, trains and the like, and a method of manufacturing the same.

BACKGROUND OF THE INVENTION

A conventional heated seat assembly is generally structured like seat assembly 112 provided with planar heater 113, or a heating unit, between the surface material 114 and the main pad 115 as shown in FIG. 12. One of the methods of manufacturing such seat assembly includes a method of integrally forming surface material and main pad by bonding the planar heater to the surface material 114 using double-coated adhesive tape followed by foaming and curing of urethane raw material poured into a mold with the surface material 114 provided therein.

Conventionally, as the planar heater used in such manufacturing method, there is one type of the planar heater (for example, as disclosed in Japanese Patent No. 2621437) that is formed by sewing a linear heater to a base material made of cloth such as non-woven fabric and urethane surface cloth as shown in FIG. 13 and FIG. 14. FIG. 13 is an outside view of a conventional seat heater, and FIG. 14 is a schematic view where a linear heater is fixed onto a base material by sewing. In FIGS. 13 and 14, linear heater 117 is sewed to base material 118 by upper thread 119 and lower thread 120, thereby forming planar heater 116.

Also, as shown in FIGS. 15 and 16, there is a planar heater (for example, as disclosed in Japanese Patent Laid-open Application H8-507404) that is formed by sandwiching a linear heater with two sheets of base material such as non-woven fabric having gas permeability. FIG. 15 is a perspective view of the planar heater, and FIG. 16 is a sectional view of the same. In FIGS. 15 and 16, planar heater 121 is formed by sandwiching linear heater 122 from both sides by base materials 123, 124 having through-holes 125. Besides this configuration, it is also possible to bond the linear heater 122 to the surface material 114 by the base material 124 being used as an adhesive film.

In the case of this planar heater, since the base material is provided with the through-holes 125, urethane raw material flows through the through-holes 125 during a production of the seat assembly, and the surface material 114 directly adheres to the main pad 115, thereby improving the adhesive strength.

However, in the conventional method of manufacturing a seat assembly using planar heaters 116, 121, the base materials 118, 123 made of non-woven fabrics or urethane are liable to be impregnated with urethane raw material, and the urethane raw material in the base materials 118, 123 cures without foaming, deteriorating the softness of the seat surface, and as a result, there arises a problem of affecting a seating "feel".

Also, in the case of planar heater 121, it is necessary to sandwich the linear heater 122 with the base materials 123, 124, and an adhesive layer is needed for the adhesion of two base materials, causing the number of members and the number of production operations to be increased, and there arises a problem of complication in production.

In the conventional method of manufacturing a heated seat assembly, as shown in FIG. 17, surface material 132 and planar heater 134 are disposed in seat mold 131, and then, urethane raw material 136 is poured in, formed, and cured.

However, in the conventional manufacturing method, the planar heater 134 moves and can not be positioned to a predetermined position due to a forming pressure of foam of the main pad 135, and it is unable to obtain an intended temperature of the seat.

Also, as shown in FIG. 18, the planar heater 134 built into the seat assembly is formed into a mat shape by sandwiching linear heater 137 with cloths 138 having through-holes 133, to which impregnation prevention mat 139 for preventing impregnation of urethane raw material and is made of felt or the like is bonded. (For example, as disclosed in Japanese Patent Examined Publication H7-87806).

In this case, since the surface material 132 and main pad 135 are bonded to each other via through-holes 133 during foaming, it is desirable to increase an opening area of the through-holes. On the other hand, if the opening area is increased by enlarging the diameter of the through-holes 133, the linear heater 137 become unable to be precisely fixed by the cloths 138, since the linear heater 137 is sandwiched between the cloths 138 having the through-holes 133. Because of such restrictive condition, the opening area of the through-hole 133 cannot be sufficiently increased, and therefore, the adhesive strength between the surface material 132 and main pad 135 is not strong enough, resulting in a problem of worsening of the "feel" due to a de-lamination of the surface material 132.

Further, since the impregnation preventing mat 139 for preventing urethane raw material from impregnating into the cloth 138 is bonded, the planar heater 134 is not bonded to the main pad 135, and there arises a problem that the surface material 134 de-laminates at a portion where the planar heater 134 is disposed, thereby worsening the "feel".

Also, an example of a linear heater used for the planar heater is disclosed in Japanese Patent Laid-open Application 2001-87080. The linear heater disclosed is, as shown in FIG. 19, a linear heater 101 formed by braiding a plurality of conductors 102. In a case of this linear heater, the stresses applied to the linear heater 101, for example, due to a load applied when being seated are dispersed to each of the conductors 102 to improve a bending durability. Also, in the Application, as shown in FIG. 20, conductor 102 and core wire 103 formed of steel wire such as a piano wire or a stainless wire are braided to form linear heater 104, or as shown in FIG. 21, the conductors 102 are braided to form heating element 106 by using tow thread 105 such as aromatic polyamide fibers, polyester fibers, and carbon fibers as a center wire, to improve the tensile strength and bending strength.

However, in the case of the conventional linear heater 104, though, the tensile strength of the linear heater can be improved, the bending strength against repetitive bending loads such as the loads applied when being seated is not sufficient. That is, a friction at crossing portions between the core wire 103 formed of steel wire such as piano wire and stainless wire and the conductor 102 causes the conductor 102 to wear and break, and it is unable to sufficiently improve the durability of the linear heater 104.

Also, in the case of the linear heater 106, generation of such wearing and breaking can be decreased, but it is difficult to produce the linear heater 106 by braiding the conductor 104 so as to have tow thread 105 as the center in a production process.

SUMMARY OF THE INVENTION

The heating element used for the heated seat assembly of the present invention comprises a base material made of a hotmelt material and a linear heater disposed in a predetermined pattern on the base material. The linear heater is bonded or sewed to the base material, and also, in one preferred embodiment of the present invention, the linear heater is formed by braiding a plurality of conductors and threads. Also, in another preferred embodiment of the present invention, a number of threads for forming the linear heater is at least the same with a number of conductors.

According to the heating element of the present invention and the method of manufacturing the heated seat assembly of the present invention, a heated seat assembly which provides excellent seating comfort, or "feel", and an even seat temperature is obtained, and the durability of the heating element is improved.

DETAILED DESCRIPTION OF THE INVENTION

The Examples of the present invention will be described in the following with reference to the accompanying drawings.

Example 1

Figure 1:
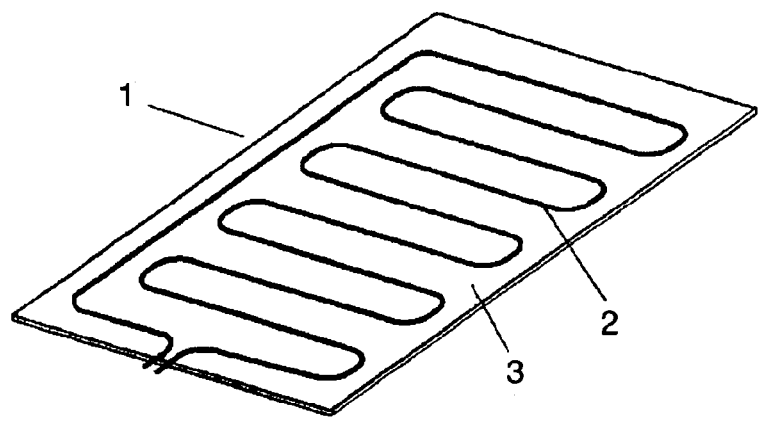
FIG. 1 is a perspective view of a planar heater in Example 1 of the present invention.

FIG. 1 is a perspective view of a planar heater (heating element) fixed in a predetermined pattern on a base material made of a hotmelt material. In FIG. 1, planar heater 1 is formed by fixing linear heater 2 using an adhesive 7 in a predetermined pattern on base material 3 made of a hotmelt material.

Figure 2:
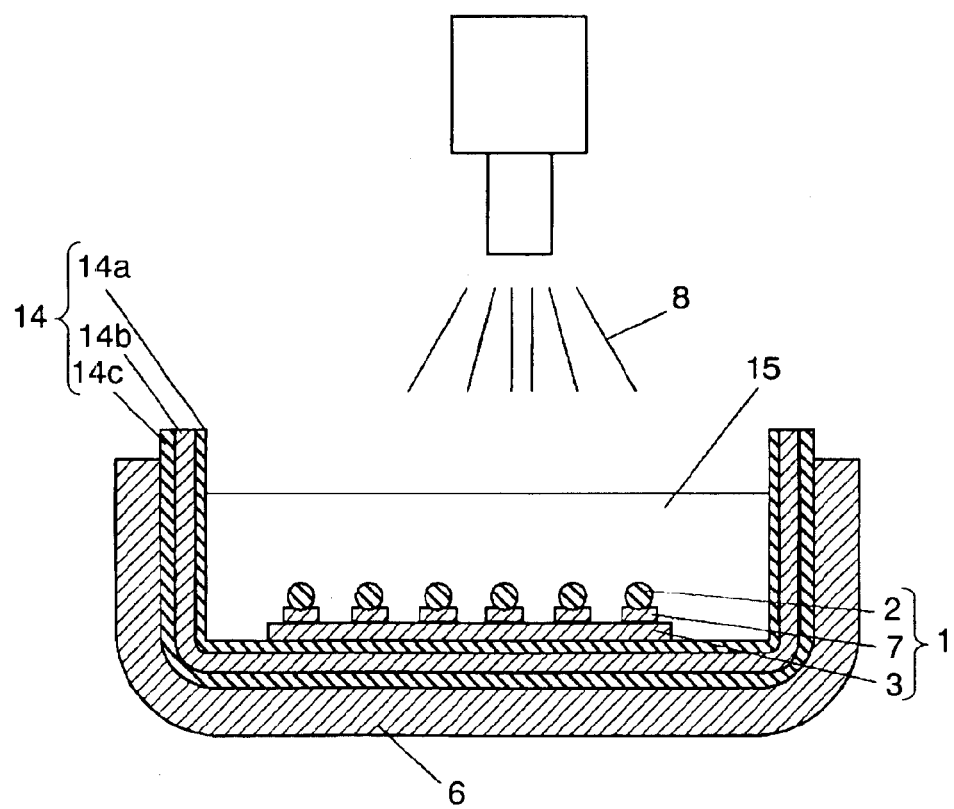
FIG. 2 is a sectional view showing a method of manufacturing a heated seat assembly using the planar heater in Example 1 of the present invention.

Next, a method of manufacturing a heated seat assembly using the planar heater 1 of the present Example is described with reference to FIG. 2. As shown in FIG. 2, surface material 14 comprises skin layer 14c made of leather, cloth or the like, cover pad 14b made of urethane foam, and cover material 14a made of polyethylene film or woven fabric coated with impregnation prevention material. After the planar heater 1 is fixed on the cover material 14a, the surface material 14 is disposed in lower seat mold 6. And, urethane raw material 8 such as polyol and polyisocyanate to form main pad 15 is poured in the surface material 14, and the urethane raw material 8 is foamed and cured with an upper seat mold (not shown) closed. The urethane raw material 8 has adhesion and adheres to the cover material 14a to be integrated. In the present Example, during foaming and curing of the urethane raw material 8, the base material 3 made of hotmelt material is melted so that the planar heater 1 is bonded to the surface material 14.

According to the above method of manufacturing the heated seat assembly, it is possible to simplify the configuration of the seat assembly while maintaining a softness of the seat. This is because the urethane raw material does not impregnate into the base material, and foamed cells are formed within the entire main pad 15, because the planar heater 1 is bonded to the surface material 14 by melting the base material 3 made of hotmelt material.

Also, since the base material 3 plays the roles of both of the base material made of non-woven fabric and the adhesive material such as double-coated adhesive tape conventionally used, the configuration of the planar heater 1 can be made simple.

As the hotmelt material of the base material 3, a material based on a polyester resin, nylon, polyolefin resin, or polyamide resin is used, but the present invention is not limited to these materials. Also, as a necessary characteristic of the hotmelt material, it is desirable for the melting temperature of base material 3 to be lower than a mold temperature when the seat is molded in order to obtain sufficient adhesive strength of the planar heater 1 to the surface material 14.

If the planar heater 1 is not uniformly bonded to the surface material 14, the urethane raw material may creep into a space between the planar heater and the surface material during the foam forming process, and it may sometimes cause variation in distance between the surface material and the planar heater. In that case, the seat surface temperature varies during heating, deteriorating the seating comfort. In order to prevent this problem, it is necessary to perform uniform bonding of the planar heater 1 and the surface material 14, and it is desirable to previously form the base material 3 in a shape of the seat assembly.

Example 2

Figure 3:
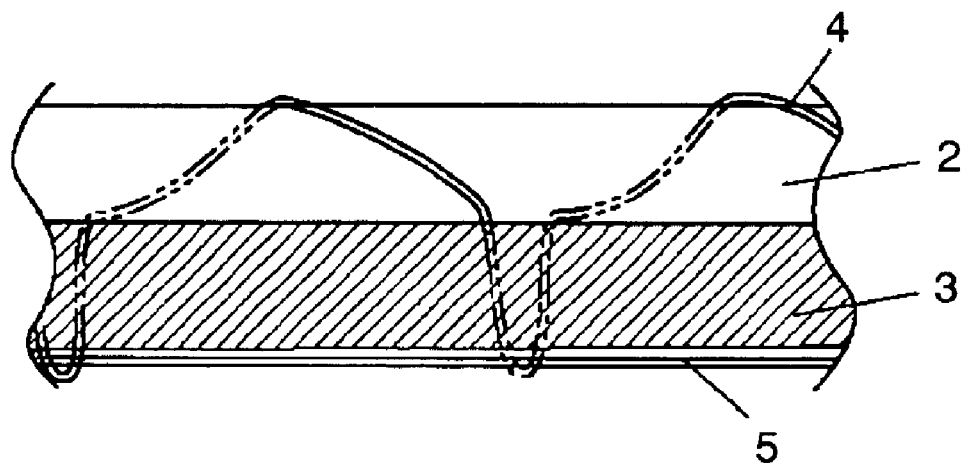
FIG. 3 is a sectional view of a planar heater in Example 2 of the present invention.

FIG. 3 is a sectional view of a planar heater in the second example of the present invention. As shown in FIG. 3, linear heater 2 is fixed on the base material 3 by sewing. As a means to dispose the linear heater 2 on the base material 3, a method of using an adhesive is generally employed. However, in a case of using an adhesive, the hotmelt material of the base material 3 may be dissolved by the adhesive, and it may decrease the strength of adjacent portions of the base material 3 where the linear heater 2 is fixed. In such case, bad influences to the hotmelt material caused by the adhesive can be avoided by fixing the linear heater on the base material 3 by sewing. FIG. 3 is a side view showing the linear heater 2 fixed by sewing, where the linear heater 2 is fixed on the base material 3 made of the hotmelt material by using upper thread 4 and lower thread 5.

Also, when at least one of the upper thread 4 and the lower thread 5 used for sewing is made of a hotmelt material it is possible to lessen a protruding of the thread at an upper part of the linear heater on a surface layer when the planar heater 1 is bonded to the surface material 14. Further, since at least one of the upper thread 4 and lower thread 5 melts, a thickness of the planar heater 1 can be reduced at the portion where the linear heater 2 is disposed.

Further, when fibrous hotmelt materials are used as the base material 3, it becomes possible to improve the softness of the planar heater as compared with a seat-shaped base material, and to lessen the stiffness of the seat when seated. Also, by using the fibrous materials, it is possible to suppress the generation of creases when the linear heater is sewed onto the base material. When the base material 3 has a specific shape such as a seat-shape, shrinking and expanding forces are applied to the base material 3 by the linear heater sewed and the upper thread and lower thread used for sewing, and such forces deform the base material, resulting in considerable creasing. However, when the fibrous base materials are used, if shrinking and expanding forces are applied to the base material by the linear heater and the upper thread and lower thread, the forces partially deform the fibrous base material. In this way, the forces deforming the entire base material 3 are reduced and dispersed, and thereby, it is possible to suppress the deformation of the base material such as creasing.

The base materials made of such fibrous hotmelt materials are available under the trade names of WEB ADHESIVE and SHARNET supplied by BOSTIK in the United States of America but the present invention is not limited to these materials.

Example 3

Figure 4:
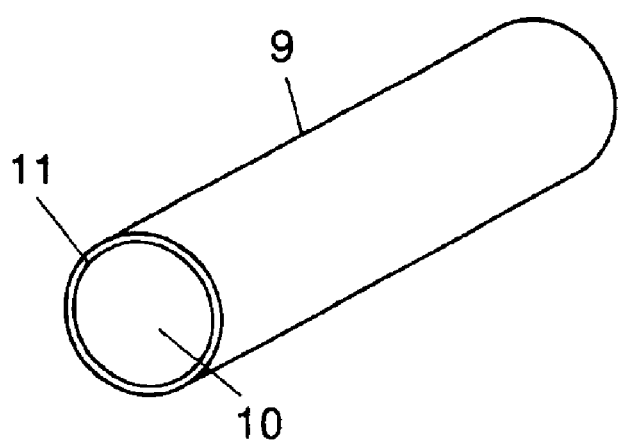
FIG. 4 is a schematic diagram of a heating element with a hotmelt layer attached to a periphery thereof in Example 3 of the present invention.

FIG. 4 is a schematic view of a linear heater with a hotmelt layer formed on a periphery thereof. In FIG. 4, the linear heater 9 of the present example is configured in that hotmelt layer 11 is formed on an outer periphery of heating element 10. The hotmelt layer 11 melts when the planar heater is heat-bonded to the surface material, then solidifies, and thereby improving the holding strength of the linear heater on the surface material.

It is preferable to use a material based on polyester resin, nylon, polyolefin resin, or polyamide resin as a material for the hotmelt layer 11, but the present invention is not limited to these materials.

In the description of the above examples, a method of using an adhesive and a method of sewing are described as the method of fixing the linear heater onto the base material, but the method of fixing the linear heater onto the base material is not limited to these methods.

Example 4

Figure 5:
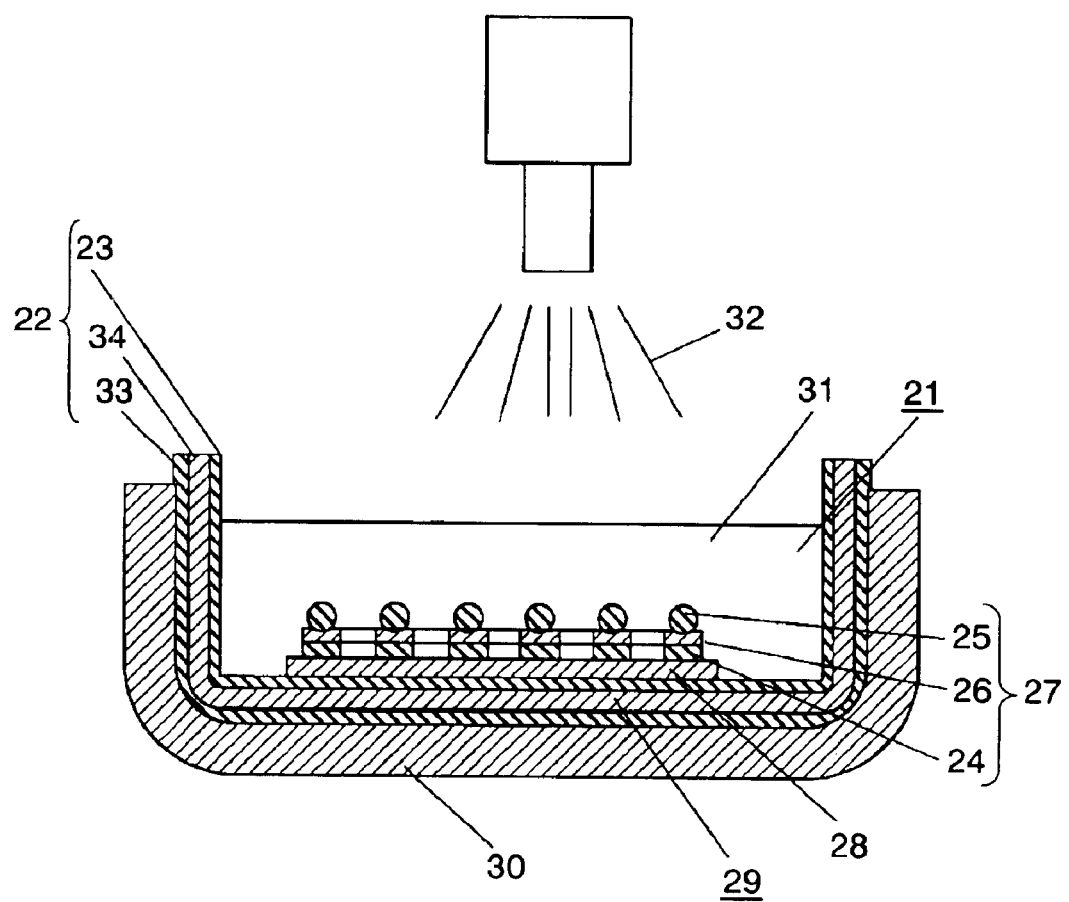
FIG. 5 is a sectional view showing a method of manufacturing a heated seat assembly in Example 4 of the present invention.
Figure 6:
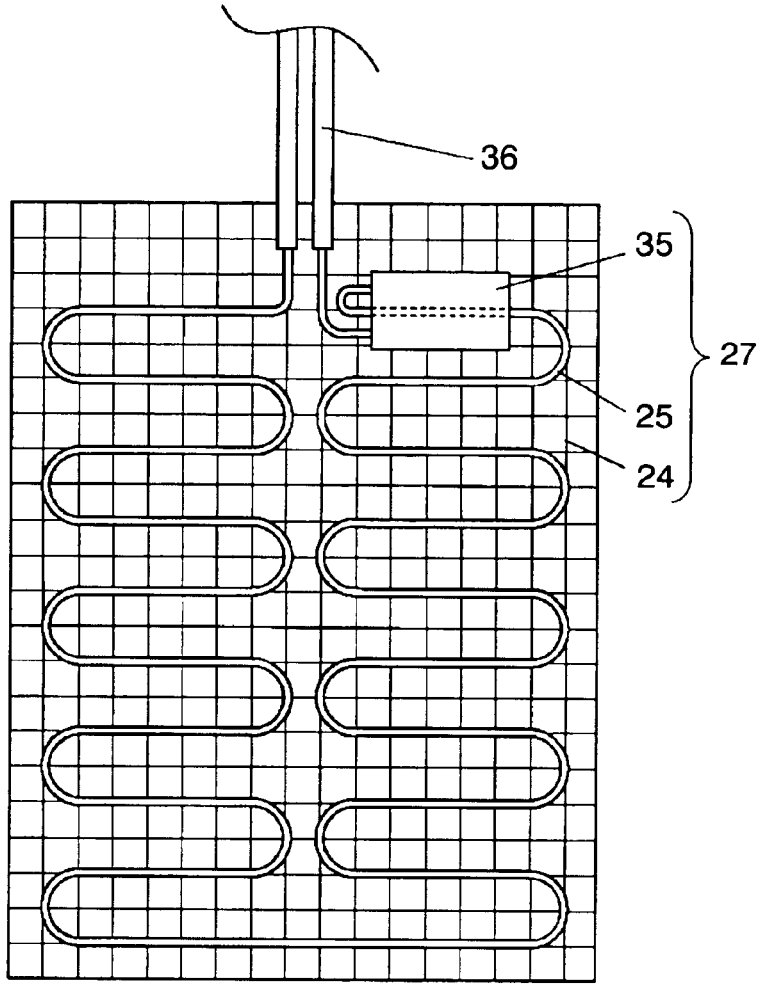
FIG. 6 is a rear view showing a planar heater in Example 4 of the present invention.

FIG. 5 is a schematic view showing a method of manufacturing a heated seat assembly in the fourth example of the present invention. FIG. 6 is a rear view of a heating element built into the seat assembly.

As shown in FIG. 5 and FIG. 6, heating element 27 has a structure where linear heater 25 and temperature regulator 35 are fixed by adhesive 26 on base material 24 having a mesh structure and made of polyester resin. Power supply line 36 is connected to the linear heater 25 and the temperature regulator 35. Also, surface material 22 comprises surface layer 33 made of leather, cloth or the like, cover pad 34 made of urethane foam, and cover material 23 made of polyethylene film or a woven fabric coated with impregnation prevention material or the like. The surface material 22 is formed by bonding, frame laminating or the like method.

Next, the method of manufacturing the heated seat assembly 21 of the present example will be described with reference to FIG. 5. As shown in FIG. 5, firstly, the cover material 23 of the surface material 22 and the heating element 27 are bonded by adhesive 28 to form trim cover 29. And the trim cover 29 is disposed in lower seat mold 30, then urethane raw material 32 that will become main pad 31 is poured onto the trim cover 29, and the urethane raw material 32 is foamed and cured while an upper seat mold (not shown) is closed. The urethane raw material 32 has adhesive ability and passes through the openings of the base material 24 and places other than the heating element 27 to be bonded and integrated with the cover material 23.

The structure of base material 24 shown in the figure forms a lattice, but the opening of the base material 24 is not limited to the shape of a lattice. For example, the openings may be circular, rhombic, or honey-comb shape, and a shape having a plurality of openings at the crossing portions of mesh (not shown) is also preferable.

In the above description, urethane resin is taken up as an example of resin to be filled in to form the main pad, but the filling resin is not limited to urethane resin. It is also possible to use silicone resin, polyethylene, polyvinyl chloride, ethylene vinyl acetate copolymer or acrylic ester copolymer. In the case of using thermoplastic resin, a molding method such as a foaming injection molding can be employed. When the molten resin viscosity is relatively high, such as occurs by foaming injection molding, the advantage of the present invention is greatly enhanced.

Regarding the heated seat assembly manufactured as described above, the advantages will be described in the following.

First, the heating element 27 is fixed on the surface material 22 by using adhesive 28, which is then integrated with the main pad 31. In the present example, the urethane raw material 32 does not creep into the surface material 22 side of the heating element 27, and also, the foaming pressure during foaming of the urethane raw material 32 does not move the heating element 27. As a result, the heating element 27 can be disposed at a predetermined position to obtain even warming temperatures as desired.

Since the base material 24 having a mesh structure is used as the base material of the heating element 27, the opening area can be increased, and the bonding area between the surface material 22 and main pad 31 becomes increased to increase the bonding strength between the surface material 22 and the main pad 31. Consequently, it is possible to prevent de-lamination of the surface material 22 and to improve the "feel" of the heated seat assembly.

Further, by using a hotmelt material which melts at a molding temperature of a foaming of the main pad 31 as the material for base material 24, the main pad 31, surface material 22, and base material 24 and linear heater 25 can be firmly fixed. As a result, it is possible to prevent de-lamination of the surface material 22 and to improve the "feel" of the heated seat assembly. Further, the linear heater 25 can be precisely disposed at a predetermined position to obtain the desired seat temperature.

Example 5

Figure 7:
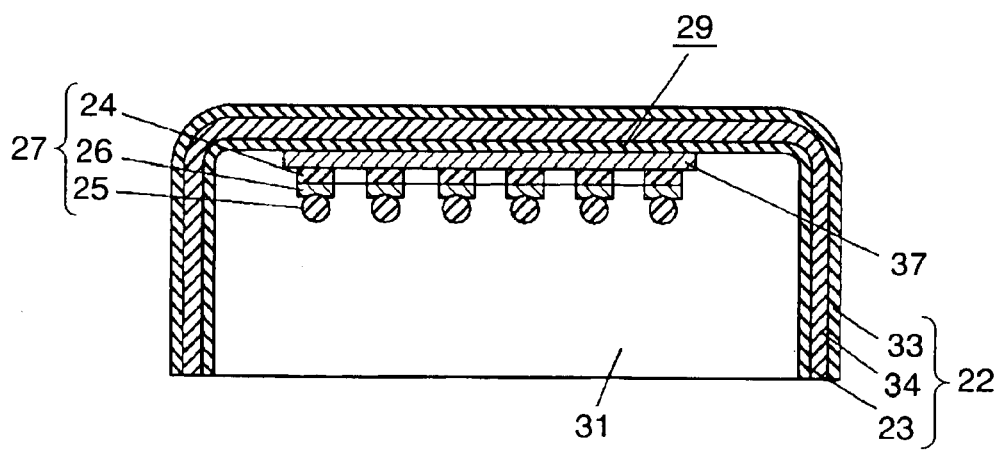
FIG. 7 is a sectional view showing a heated seat assembly in Example 5 of the present invention.

FIG. 7 is a sectional view showing a heated seat assembly in the fifth example of the present invention. As shown in FIG. 7, the point of difference of the present example from example 4 is that hotmelt layer 37 made of polyamide resin, polyethylene resin or the like is disposed between the heating element 27 and the surface material 22 in order to thermally bond the heating element 27 onto the surface material 22.

Regarding the heated seat assembly having the above configuration, the advantages will be described in the following.

In the present example, the hotmelt layer 37 is disposed between the surface material 22 and the heating element 27, and the surface material 22 and the heating element 27 are heat bonded. By this configuration, the process is simplified and a time required for bonding is shortened as compared with a manufacturing method using adhesive, and also, because no solvent is used, the manufacturing method is excellent from the viewpoint of environmental protection. Also, since an entire surface of the heating element 27 can be uniformly bonded and fixed, the adhesive strength between the surface material 22 and the heating element 27 can be further improved. As a result, the entire heating element 27 can be firmly fixed on the surface material 22, and it is possible to prevent de-lamination of the surface material 22 and to improve the "feel" as a heated seat assembly.

Example 6

Figure 8:
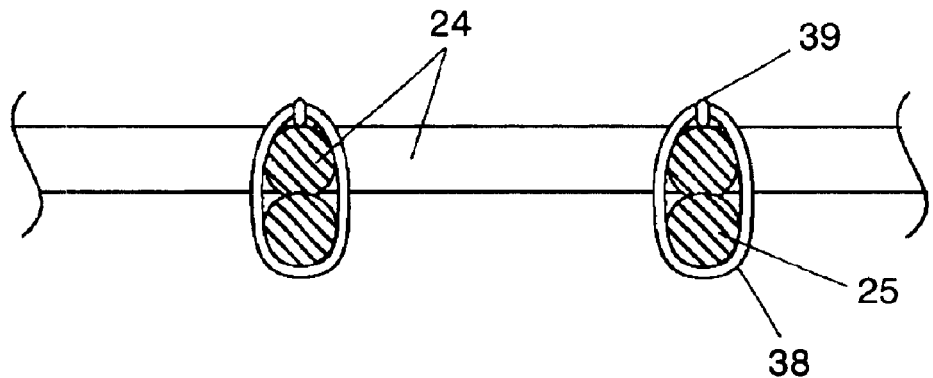
FIG. 8 is a sectional view showing a heating element according to Example 6 of the present invention.

FIG. 8 is a sectional view showing a heating element according to the sixth example of the present invention. In the present example, in place of the heating element in example 4, linear heater 25 is fixed on base material 24 of mesh structure by sewing with upper thread 38 and lower thread 39.

Regarding the method of manufacturing a heated seat assembly having the above configuration, the advantages will be described in the following.

Since the linear heater 25 of heating element 27 and the base material 24 of mesh structure are fixed by sewing with the upper thread 38 and the lower thread 39, the linear heater 25 can be firmly fixed on the base material 24 of mesh structure. Further, in the present example, the urethane raw material for main pad 31 impregnates into the upper thread 38 and lower thread 39 fixing the linear heater 25 and base material 24, and firmly integrates the main pad 31 and the linear heater 25 via upper thread 38 and lower thread 39. As a result, the linear heater 25 can be precisely disposed at a predetermined position, and it is possible to obtain even seat temperatures.

Example 7

Figure 9:
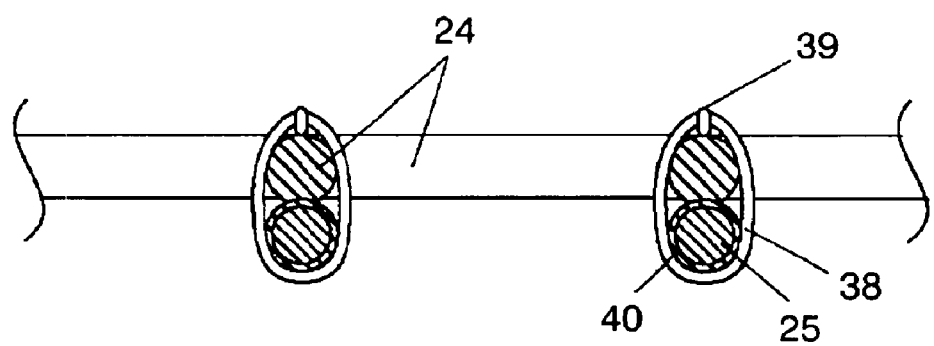
FIG. 9 is a sectional view showing a heating element according to Example 7 of the present invention.

FIG. 9 is a sectional view showing a heating element according to a seventh example of the present invention. In FIG. 9, the point of difference from example 6 is that the linear heater 25 has a hotmelt layer 40 as an outer layer which melts at the molding temperature of foaming of main pad 31.

Regarding the method of manufacturing a heated seat assembly having the above configuration, the advantages will be described in the following.

Since the outer layer of linear heater 25 has the hotmelt layer 40 which melts at the molding temperature in foaming of main pad 31, the main pad 31 and base material 24 can be firmly integrated with the linear heater 25 via the heat-melting layer 40. Accordingly, the linear heater 25 can be firmly disposed at a predetermined position, and it is possible to obtain even seat temperatures as desired.

Example 8

Figure 10:
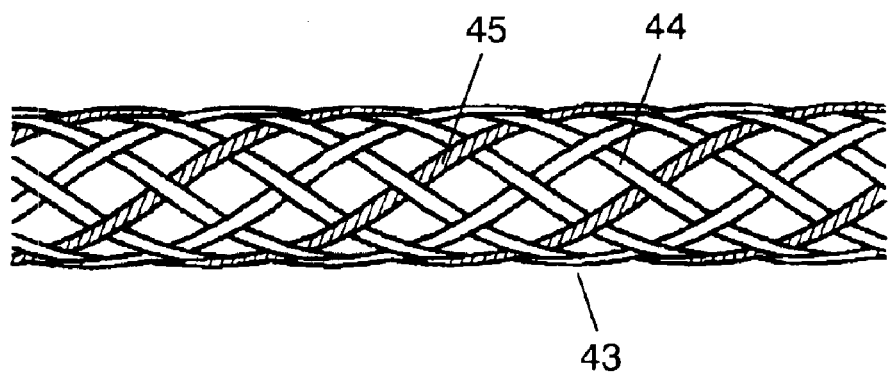
FIG. 10 is an enlarged view of a linear heater according to Example 8 of the present invention.

FIG. 10 is an enlarged view of a linear heater that can be used in each of the above examples of the present invention. The linear heater 43 comprises a plurality of conductors 44 and threads 45 braided.

As shown in FIG. 10, since the conductors 44 and threads 45 are braided, it is possible to reduce bending stresses applied to the conductors 44 by a load such as a load applied when a driver or a passenger is seated. Also, the threads 45 serve as a buffer material against the friction between conductors 44, and it is possible to avoid sharp bending angles of the conductors 44, and thus, the bending durability of the linear heater 43 is greatly improved.

When a heating element of high resistance is required in particular, it is necessary to decrease the number of conductors 44 comprising the linear heater 43. A conventional linear heater is formed of only conductors, and therefore, a strength of the linear heater decreases. However, according to the linear heater of the present example that is braided with the conductors 44 and threads 45, even in a case of the linear heater 43 of high resistance, it is possible to easily improve the tensile strength and the bending durability by the threads 45. As the threads 45, it is effective to use tow threads of such as aromatic polyamide fiber, polyester fiber, and carbon fiber, but the thread usable for the present invention is not limited to these fibers.

Also, it is possible to improve the durability of linear heater 43 as well as the water resistance and corrosion resistance by coating the conductors 44 with insulating material. As the insulating material, urethane resin is generally used by coating methods such as electro-deposition or dip-coating. However, it is effective to use a highly lubricant material such as fluorocarbon resin as the insulating material. When the highly lubricant material is used, the friction between the conductors 44 or between the conductors 44 and the threads 45 can be reduced, and it is possible to suppress the wear of the conductors, thereby improving the durability of the linear heater 43. As for the insulation material, insulating materials which are generally employed can be used, and it is not limited to the material mentioned in the present example.

Also, by using a highly lubricant material for the thread 45 itself, the friction between the conductors 44 and threads 45 can be reduced. As for the method of making the thread lubricant, various methods are available, for example, a method of coating or impregnating the tow thread such as polyester fiber with a highly slippery material such as fluoro-carbon resin, or spinning threads using highly lubricant fiber.

Also, it is necessary to properly use linear heaters different in resistance per unit length, and it should be easy to select an appropriate resistance of the linear heater 43 in the manufacturing process. In the present example, the thread 45 may be colored to indicate the resistance. This makes it possible to easily select the resistance of the linear heater 43, and thereby, prevent a wrong use of the linear heater in the manufacturing process. Also, the color indication may be applied to to the insulating material.

Example 9

Figure 11:
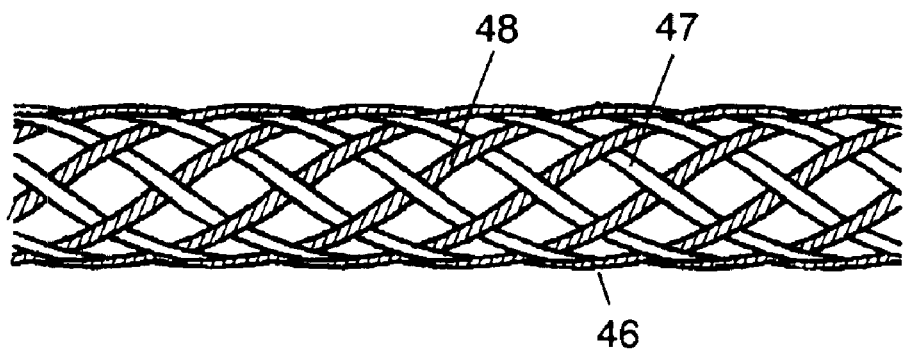
FIG. 11 is an enlarged view of a linear heater according to Example 2 of the present invention.
Figure 12:
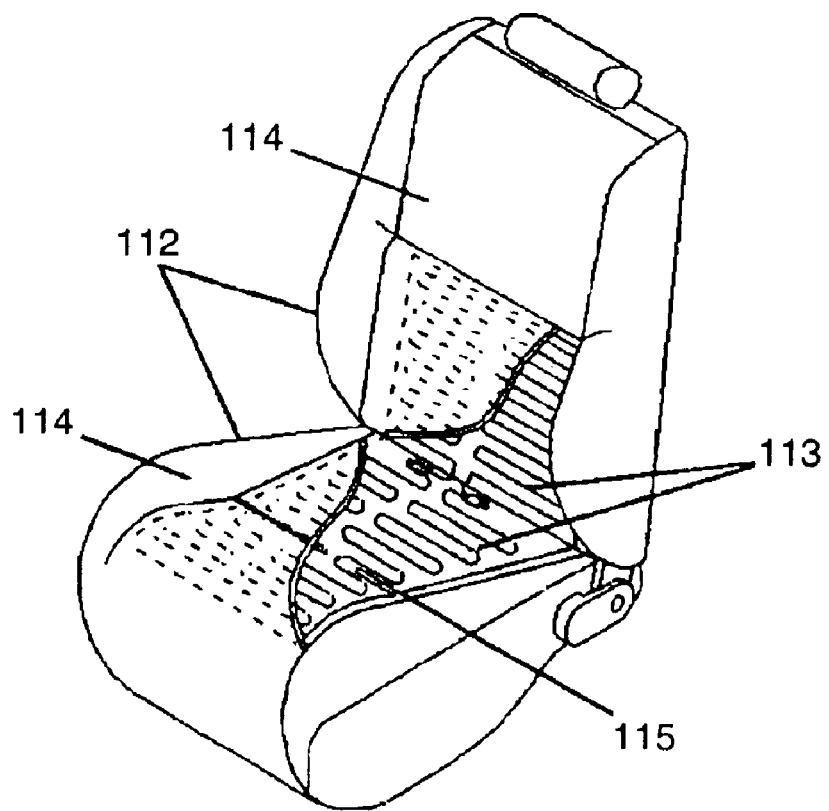
FIG. 12 is a perspective view showing a conventional planar heater being mounted in a car seat assembly.
Figure 13:
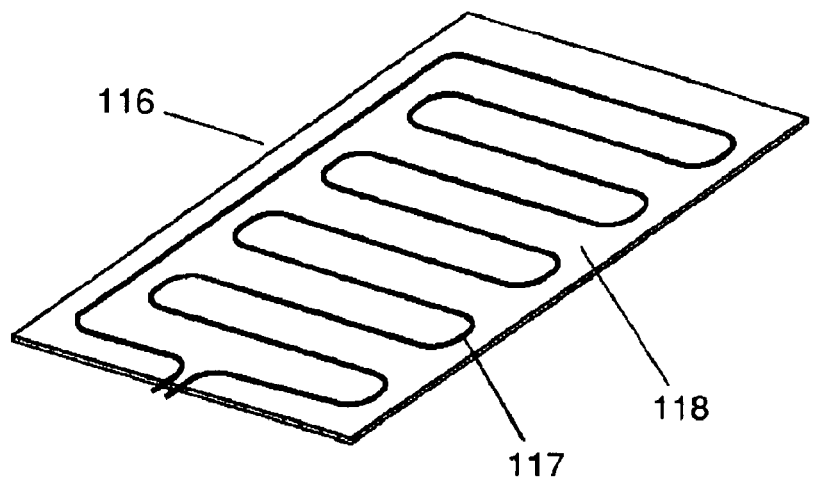
FIG. 13 is a schematic view of a conventional planar heater.
Figure 14:
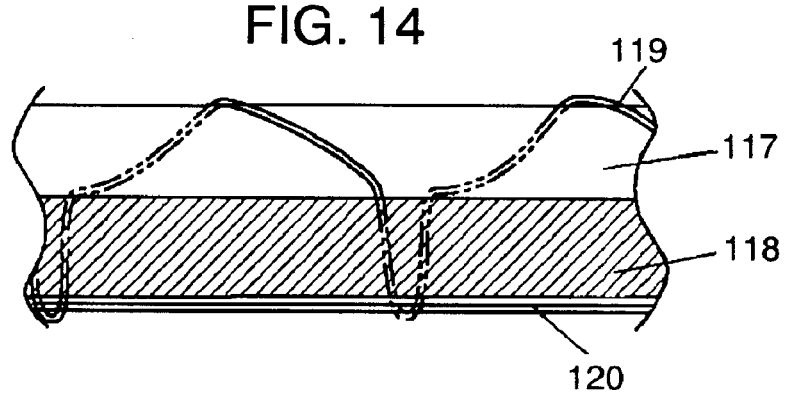
FIG. 14 is a sectional view of a heating element fixed portion of the conventional planar heater.
Figure 15:
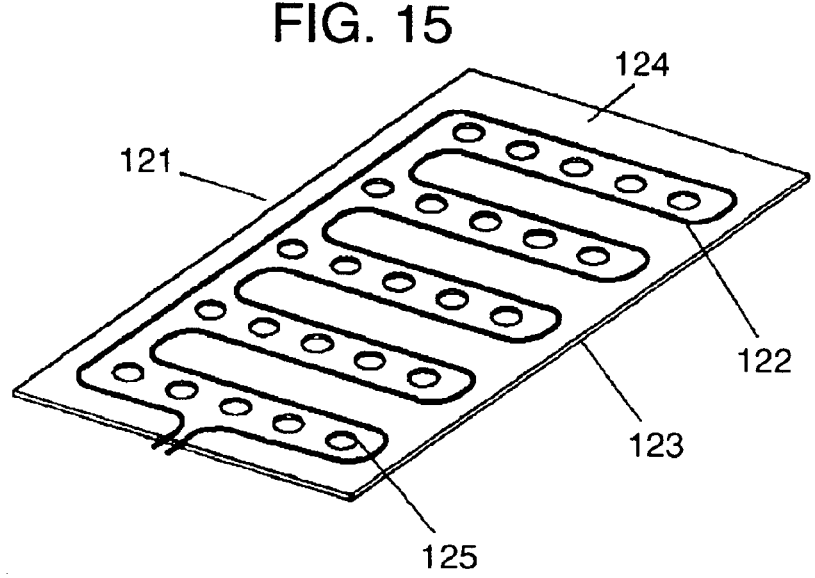
FIG. 15 is a schematic view of another conventional planar heater.
Figure 16:
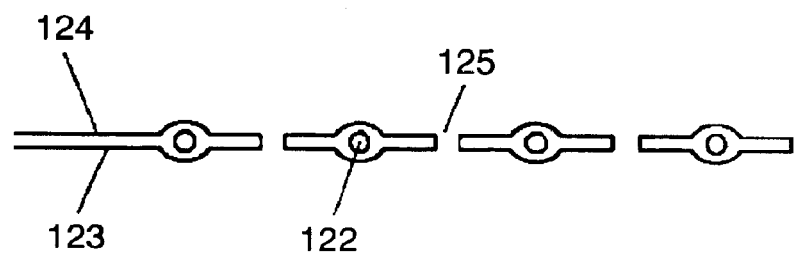
FIG. 16 is a sectional view of another conventional planar heater.
Figure 17:
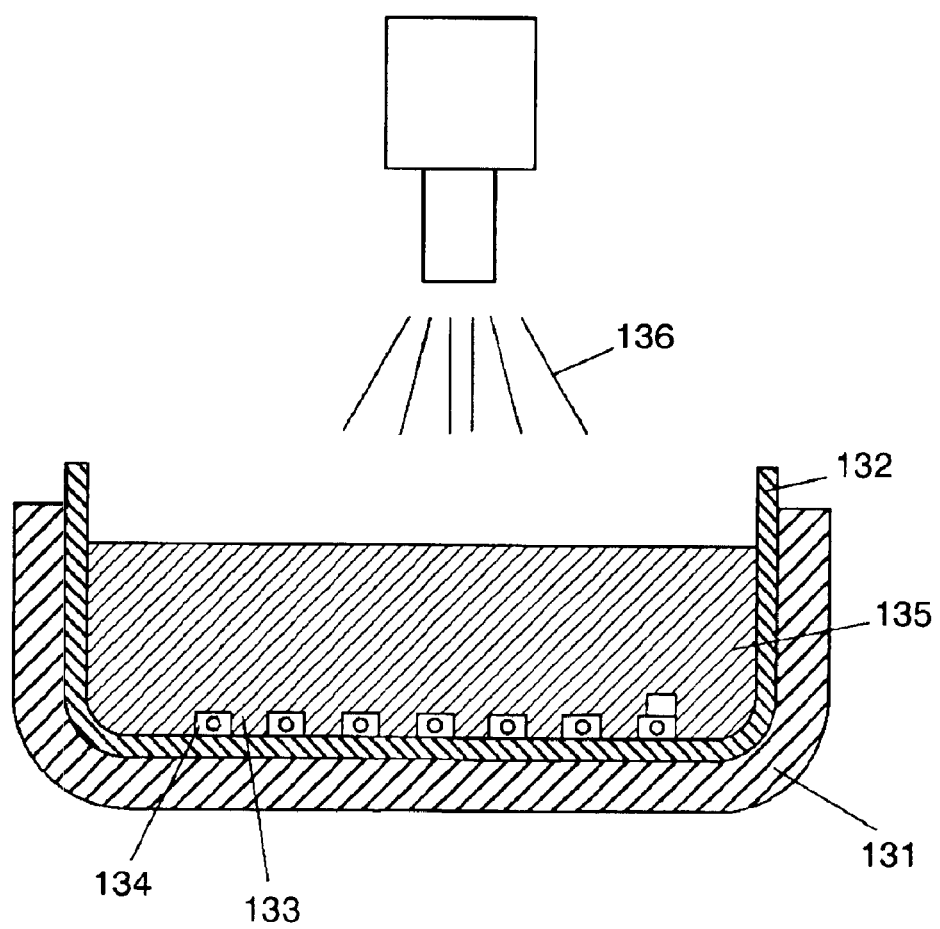
FIG. 17 is a schematic view showing a method of manufacturing a conventional heated seat assembly.
Figure 18:
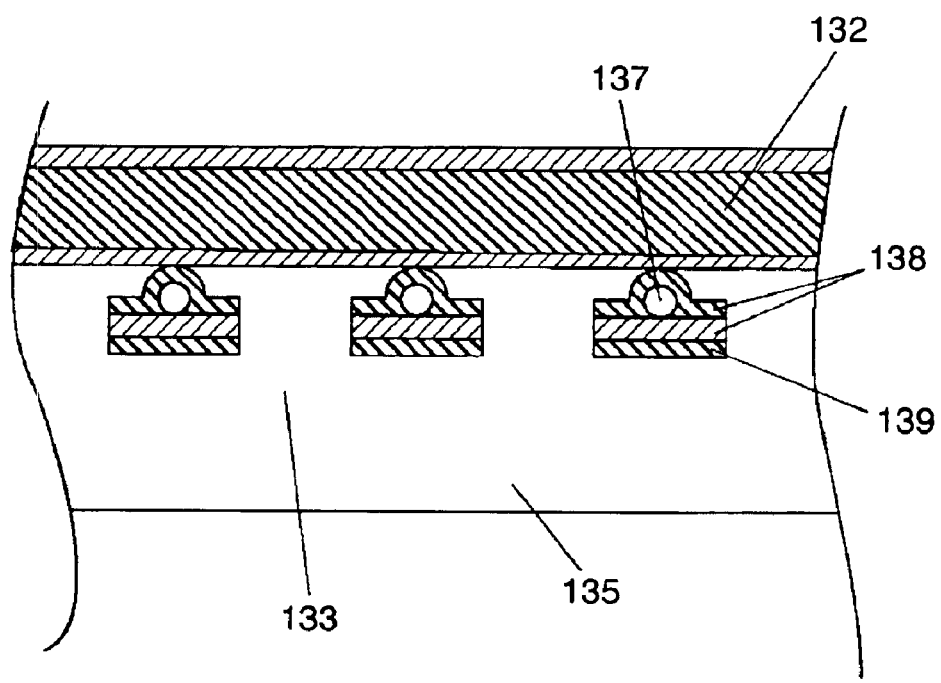
FIG. 18 is a sectional view showing another conventional heated seat assembly.
Figure 19:
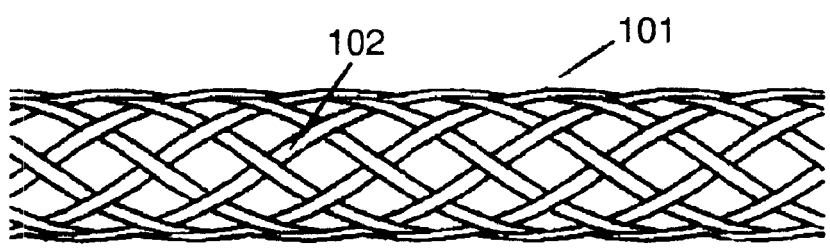
FIG. 19 is an enlarged view of a conventional linear heater.
Figure 20:
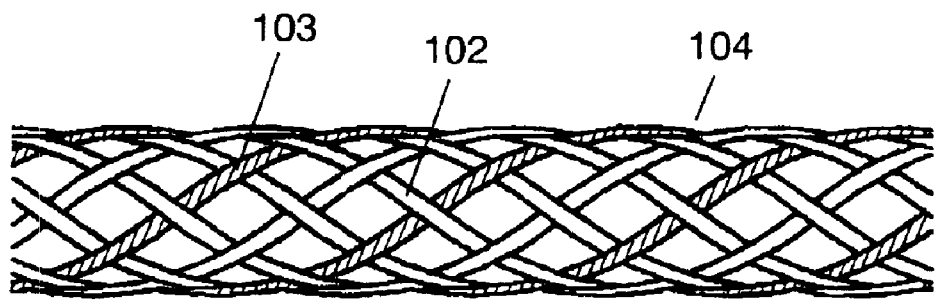
FIG. 20 is an enlarged view of another conventional linear heater.
Figure 21:
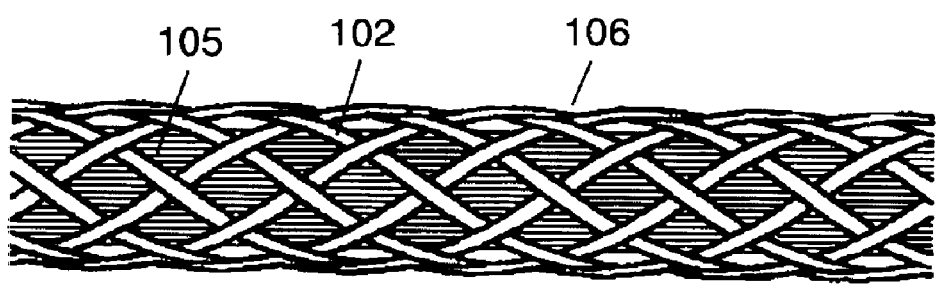
FIG. 21 is an enlarged view of still another conventional linear heater.

FIG. 11 is an enlarged view of linear heater 46 wherein a number of threads 48 is at least the same with a number of conductors 47 in the configuration of Example 8. As shown in FIG. 11, according to the configuration of the present example, the conductors 47 do not cross with each other. As a result, the conductors 47 do not become worn by rubbing with each other according to the stress applied to the linear heater 46, a breakdown of conductors 47 can be reduced and the durability of heater 46 improves.

As described above, according to the heated seat assembly of the present invention an excellent seating comfort, or an excellent "feel", and an even seat temperature can be obtained. Also, according to the method of manufacturing of the heated seat assembly of the present invention, an even and comfortable seat temperature can be obtained because the heater can be disposed at a predetermined position. Further, the strength of the linear heater of the present invention is improved as compared with a conventional heater, and the wear due to the friction between the conductors is reduced, and the durability of the planar heater is improved.

What is claimed is:

1. A heated seat assembly comprising:
   a seat surface material;
   a heating element fixed inside said seat surface material, said heating element consisting of
     one sheet of base material made of a hotmelt material, and
     a linear heater disposed on said base material and being sewn to said base material with no adhesive being interposed between said base material and said linear heater to secure said linear heater to said base material; and
   a resin filled inside of said seat surface material and covering said heating element;
   wherein said linear heater is fixed to an inside of said seat surface material by said hotmelt material.

2. The seat assembly of claim 1, wherein said base material is in a form of one of sheet and mesh structure.

3. The seat assembly of claim 1, wherein said base material is made of fibrous material.

4. The seat assembly of claim 1, wherein said linear heater is sewn to said base material by thread made of hotmelt material.

5. The seat assembly of claim 1, wherein said linear heater comprises a linear heating element with a hotmelt layer formed around an outer periphery of said linear heating element.

6. The seat assembly of claim 1, wherein said linear heater has a braided structure comprising a plurality of conductors and threads.

7. The seat assembly of claim 6, wherein a number of said threads forming said linear heater is not less than a number of said conductors.

8. The seat assembly of claim 7, wherein said linear heater has a structure wherein said conductors do not cross with each other.

9. The heating element of claim 6, wherein said conductor has an insulating coating layer.

10. The seat assembly of claim 9, wherein said insulating coating layer comprises a lubricant.

11. The seat assembly of claim 9, wherein said insulating coating layer is colored for indication.

12. The seat assembly of claim 6, wherein said thread comprises a lubricant.

13. The seat assembly of claim 12, said thread comprises one of fibers coated with highly lubricant material and highly lubricant fibers.

14. A method of manufacturing a heated seat assembly, comprising:
    providing a seat surface material;
    preparing a heating element consisting of one sheet of base material and a linear heater sewn to said base material with no adhesive being interposed between said base material and said linear heater to secure said linear heater to said base material, said base material being a hotmelt base material;
    filling and curing resin inside of said seat surface material so as to cover said heating element; and
    fixing said heating element inside said seat surface material by fixing said linear heater to an inside of said seat surface material by hot-melting of said hotmelt base material during said filling and curing.

15. The method of claim 14, wherein
    said filling of said resin inside of said seat surface material causes said linear heater to be bonded to the inside of said seat surface material due to hot-melting of said hotmelt base material upon said filling of said resin.

16. The method of claim 14, wherein
    said linear heater has an outer layer formed of a hot-melt layer; and
    said filling of said resin inside of said seat surface material causes hot-melting of said outer layer of said linear heater.

17. The method of claim 14, wherein
    said hotmelt base material melts at a molding temperature of said resin.

18. The method of claim 17, wherein
    said base material has a mesh structure.

19. The method of claim 14, wherein
    said resin is a urethane resin.

20. The method of claim 14, wherein
    said filling of said resin comprises foaming injection molding.

* * * * *

UNITED STATES PATENT AND TRADEMARK OFFICE
CERTIFICATE OF CORRECTION

| | | |
|---|---|---|
| PATENT NO. | : 6,969,827 B2 | Page 1 of 1 |
| APPLICATION NO. | : 10/627692 | |
| DATED | : November 29, 2005 | |
| INVENTOR(S) | : Mitsuru Yoneyama et al. | |

It is certified that error appears in the above-identified patent and that said Letters Patent is hereby corrected as shown below:

IN THE CLAIMS

In claim 13, at column 10, line 12, please replace "claim 12, said" with --claim 12, wherein said--.

Signed and Sealed this

Twentieth Day of February, 2007

JON W. DUDAS
*Director of the United States Patent and Trademark Office*